United States Patent [19]

Sutcliffe et al.

[11] 4,344,476

[45] Aug. 17, 1982

[54] SUPERCOOL METHOD FOR PRODUCING SINGLE CRYSTAL MERCURY CADMIUM TELLURIDE

[75] Inventors: Edward Y. Sutcliffe, Santa Barbara; Roger A. Cole, Goleta, both of Calif.

[73] Assignee: Santa Barbara Research Center, Goleta, Calif.

[21] Appl. No.: 214,382

[22] Filed: Dec. 8, 1980

Related U.S. Application Data

[63] Continuation-in-part of Ser. No. 71,149, Aug. 30, 1979, abandoned.

[51] Int. Cl.$^3$ .................. B22D 27/04; B22D 27/08; H01L 21/34
[52] U.S. Cl. .................. 164/76.1; 156/619; 156/624; 164/71.1; 164/122.1; 164/122.2; 252/62.3 ZT; 252/62.3 V
[58] Field of Search .................. 164/47, 60, 71, 77, 164/80, 76, 122, 125, 128, 136, 71.1, 122.1, 122.2, 76.1; 23/305 R; 252/518, 521, 62.3 ZT, 62.3 V; 156/617 R, 617 V, 619, 624, 600, DIG. 72

[56] References Cited

U.S. PATENT DOCUMENTS

3,468,363  9/1969  Parker et al. .................. 164/125
3,622,399  11/1971  Johnson .................. 252/62.3 ZT X

OTHER PUBLICATIONS

Journal of the Electrochemical Society 116, (1969), "Preparation of Cd$_x$Hg, Te Crystals by the Vertical-Zone Melting Method", E. Z. Dziuba, pp. 104–106.
Metallurgical Transactions 1, (1970), "Rapid Nondestructive Evaluation of Macroscopic Defects in Crystalline Materials: The Laue Topography of (HgCd)Te"; L. N. Swink–M. J. Brau, pp. 629–634.
Journal of Electronic Materials 1, (1972), "Single Crystal Growth of Hg$_{1-x}$Cd$_x$Te"; T. C. Hartman, pp. 230–242.
Journal of Electronic Materials 5, (1976), "Hg-Cd-Te Phase Diagram Determination by High Pressure Reflux", J. Steininger, pp. 299–320.
Journal of the Electrochemical Society 125, 1978, "A Possible Method for the Growth of Homogeneous Mercury Cadmium Telluride Single Crystals" G. Fiorito, G. Gasparrini, D. Passoni, pp. 315–317.
Journal of Crystal Growth 37, (1977), "Pressure Reflux Technique for Growth of Hg$_{1-x}$Cd$_x$Te Crystals", J. Steininger, pp. 107–115.
Journal of the Electrochemical Society 117, Abstract No. 87, (1970).

*Primary Examiner*—Gus T. Hampilos
*Attorney, Agent, or Firm*—David W. Collins; W. H. MacAllister

[57] ABSTRACT

A process for producing single crystal Hg$_{1-x}$Cd$_x$Te is disclosed. An ingot of Hg$_{1-x}$vd$_x$Te is prepared from a stoichiometric mixture of mercury, cadmium and tellurium by the supercooling of a heated mixture thereof from a point above liquidus to a point, a predetermined function of x, below liquidus. The ingot is then quenched in ambient air, producing a large amount of crystallites with small grain boundaries. The subsequent application of heat to the ingot yields a relatively large amount of single crystal material.

6 Claims, 3 Drawing Figures

SUPERCOOL METHOD FOR PRODUCING SINGLE CRYSTAL MERCURY CADMIUM TELLURIDE

The Government has rights in this invention pursuant to Contract No. DASG60-77-C-0005 awarded by the Department of the Army.

CROSS-REFERENCE TO RELATED APPLICATION

This application is a continuation-in-part application of Ser. No. 071,149, filed Aug. 30, 1979, and now abandoned.

BACKGROUND OF THE INVENTION

1. Field of the Invention

The present invention relates to processes for producing mercury cadmium telluride and, in particular, to processes applicable to the production of such materials having a unitary crystalline structure and to the product obtained thereby.

2. Description of the Prior Art

During the past decade, mercury cadmium telluride has gained increasing prominence among materials suitable for the fabrication of photodetectors and the like. The detector qualities inherent in this ternary compound may be traced to its "pseudo-binary" character. That is, both mercury and cadmium are known to behave as though they were the only element in combination with the tellurium. Thus, a photodetector material is presented which consists of a mixture of cadmium telluride, a wide gap semiconductor ($E_g = 1.6$ eV), and mercury telluride, a semi-metal having a negative energy gap of about $-0.3$ eV. The resultant alloy is found to have an energy gap which varies approximately linearly with x, the mole-fraction of cadmium telluride in the alloy. Thus, with proper selection of the fraction x, electronic responses may be obtained over a wide range of infrared wavelengths, a very desirable photodetector characteristic. High performance HgCdTe detectors have been achieved for wavelengths from about 1 to 30 micrometers.

Optimum detector performance is achieved when the detector is formed of monocrystalline material. Such material features a regular geometrical lattice throughout as opposed to polycrystalline material in which grain boundaries of various orientations may act as recombination sites for electrons and holes, thereby reducing the lifetime and detector performance.

A presently favored method of manufacture of monocrystalline $Hg_{1-x}Cd_xTe$ involves the compounding of a hot liquid mixture (of selected cadmium telluride mole fraction) followed by a quenching process wherein a solid ingot is produced. The ingot is then treated by any of a number of processes loosely referred to as "solid state recrystallization". These may include a variety of methods of applying sustained heat to the ingot for a number of weeks. The quenching and compounding process is discussed, inter alia, in articles by E. Z. Dziuba ["Preparation of $Cd_xHg_{1-x}Te$ Crystals by the Vertical-Zone Melting Method", Journal of the Electrochemical Society 116, 104–106 (1969)], L. N. Swink and M. J. Brau ["Rapid, Nondestructive Evaluation of Macroscopic Defects in Crystalline Materials: The Laue Topography of (Hg,Cd)Te", Metallurgical Transactions 1, 629–634 (1970)], T. C. Harman ["Single Crystal Growth of $Hg_{1-x}Cd_xTe$", Journal of Electronic Materials 1, 230–242 (1972), J. Steiniger ["Hg-Cd-Te Phase Diagram Determination by High Pressure Reflux", Journal of Electronic Materials 5, 299–320 (1976)], and G. Fiorito et al. ["A Possible Method for the Growth of Homogeneous Mercury Cadmium Telluride Single Crystals", Journal of the Electrochemical Society 125, 315–317 (1978)]. Discussions of solid state recrystallization are found in articles by M. J. Brau et al. ["The Preparation and Electrical Properties of HgCdTe Alloys", Journal of the Electrochemical Society 117, 95C, Abstract No. 87 (1970)], and J. Steininger ["High Pressure Reflux Technique for Growth of $Hg_{1-x}Cd_xTe$ Crystals", Journal of Crystal Growth 37, 107–115 (1977)]. See also U.S. Pat. Nos. 3,622,399 and 3,468,363.

Economical manufacture of mercury cadmium telluride photodetectors demands that production processes yield maximum single crystal material. Additionally, it is desirable, though not essential, that the crystal produced approach homogeneity (constant x) throughout the length of the grown crystal. Alternatively, detectors of varying radiation sensitivities can be produced from various "slices" of a single crystal of $Hg_{1-x}Cd_xTe$.

The quantity of single crystal material eventually grown (via solid state recrystallization) is quite dependent upon the character of the ingot which acts as its "seed". The recrystallization growth process occurs as a result of the decrease in the free energy of relatively high energy polycrystalline material to that of lower energy single crystal material. Maximum single crystal material is obtained when the ingot's microscopic structure consists of a large number of relatively high free energy crystallites.

SUMMARY OF THE INVENTION

In accordance with the invention, there is provided a process for producing large quantities of single crystal mercury cadmium telluride from an ingot having a large number of crystallites with small grain boundaries. According to this process, as a first step, a desired stoichiometric mixture of mercury, cadmium and tellurium of a particular cadmium telluride mole-fraction x is added to an ampoule with a slight excess of mercury. The mixture is then heated to a predetermined number of degrees above liquidus. While the mixture is being heated, the furnace is rocked at $\pm 45°$ (with reference to the horizontal) to assure a homogeneous liquid compound. After the desired heat up temperature has been achieved and maintained, the application of heat is discontinued. The rocking is discontinued at $+45°$ to vertical, the container brought to the vertical and the mixture allowed to supercool in accordance with the cadmium telluride mole-fraction of the mixture. At the predetermined supercool temperature, the ampoule is quickly exposed to ambient air temperature. An ingot is thereby produced having the very desirable large quantity of crystallites with small grain boundaries as aforementioned.

Any number of solid state recrystallization processes may then be employed to grow a large amount of single crystal mercury cadmium telluride resulting from the release of the large amount of energy contained in the high energy crystallites of the ingot produced as above-described.

Advantageously, the present invention provides a process for the manufacture of single crystal mercury cadmium telluride having a significantly greater yield than may be achieved by prior art methods of manufacture. This is achieved by a process involving the production of an ingot having a large number of crystallites with small grain boundaries. The production of single crystal mercury cadmium telluride is achieved over a broad range of mole-fractions of cadmium telluride employing the process of the invention.

Other and further aspects of the present invention will become apparent during the course of the following description and by reference to the accompanying Drawing.

BRIEF DESCRIPTION OF THE DRAWING

Referring now to the Drawing, in which like numerals represent like parts throughout.

DETAILED DESCRIPTION OF THE INVENTION

Figure 1:
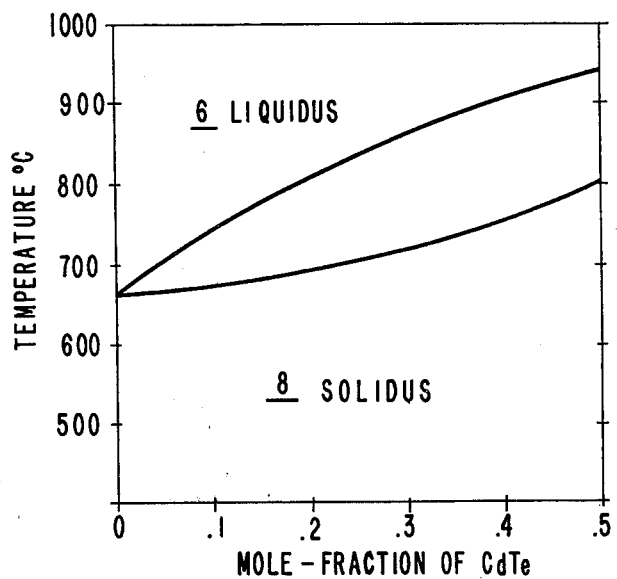
FIG. 1 presents a graph of the phase/temperature interrelationship of various compounds of mercury cadmium telluride characterized according to cadmium telluride mole-fraction.

As a frame of reference to aid the discussion to follow, the reader is first referred to FIG. 1 wherein there is presented a graph of the liquidus 6 and solidus 8 regions of a mercury cadmium telluride system. In FIG. 1, ordinate values represent temperature in degrees centigrade (°C.) while the mole-fraction of cadmium telluride x, which characterizes the system, is plotted upon the abscissa of the graph. It is seen from FIG. 1, that as the mole-fraction of cadmium telluride is increased, the solidus state of the system extends to a progressively higher temperature. This reflects an equivalent decrease in mercury telluride.

Figure 2:
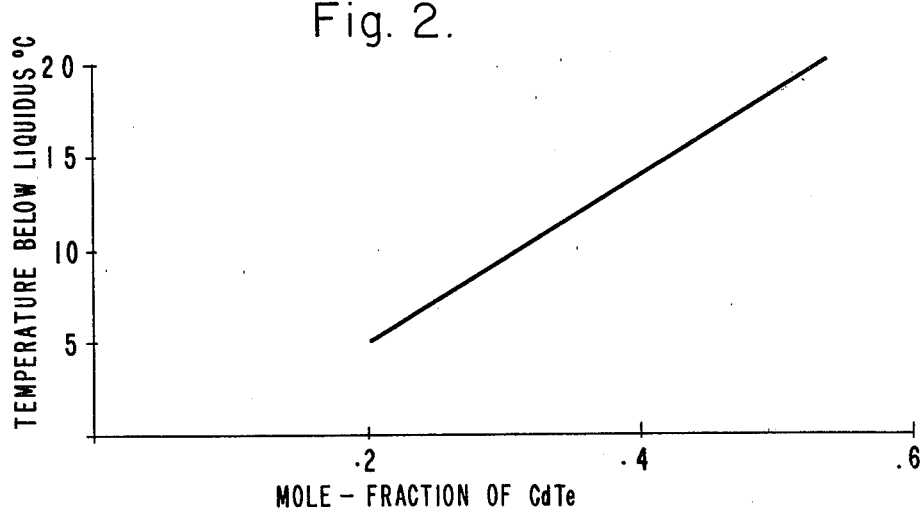
FIG. 2 presents a graph of the supercooling profile of mercury cadmium telluride of the present invention, displaying the relationship of quenching temperature to the cadmium telluride mole-fraction of the given compound.

In FIG. 2 there is shown a graph which represents the supercooling profile of the invention, the purpose of which will be discussed infra. The abscissa of FIG. 2, as that of the previous figure, represents the cadmium telluride mole-fraction, x, thus defining a given stoichiometric system. The ordinate of FIG. 2 plots degrees centigrade below liquidus corresponding thereto. One may relate the graphs of FIGS. 1 and 2 by envisioning of FIG. 2 as a line sketched upon the phase graph of FIG. 1 lying close to but beneath the liquidus boundary line and having a distance (spacing) therefrom which becomes progressively greater as x increases. This line lies within the "slush" region 9, i.e. between the liquidus and solidus.

Figure 3:
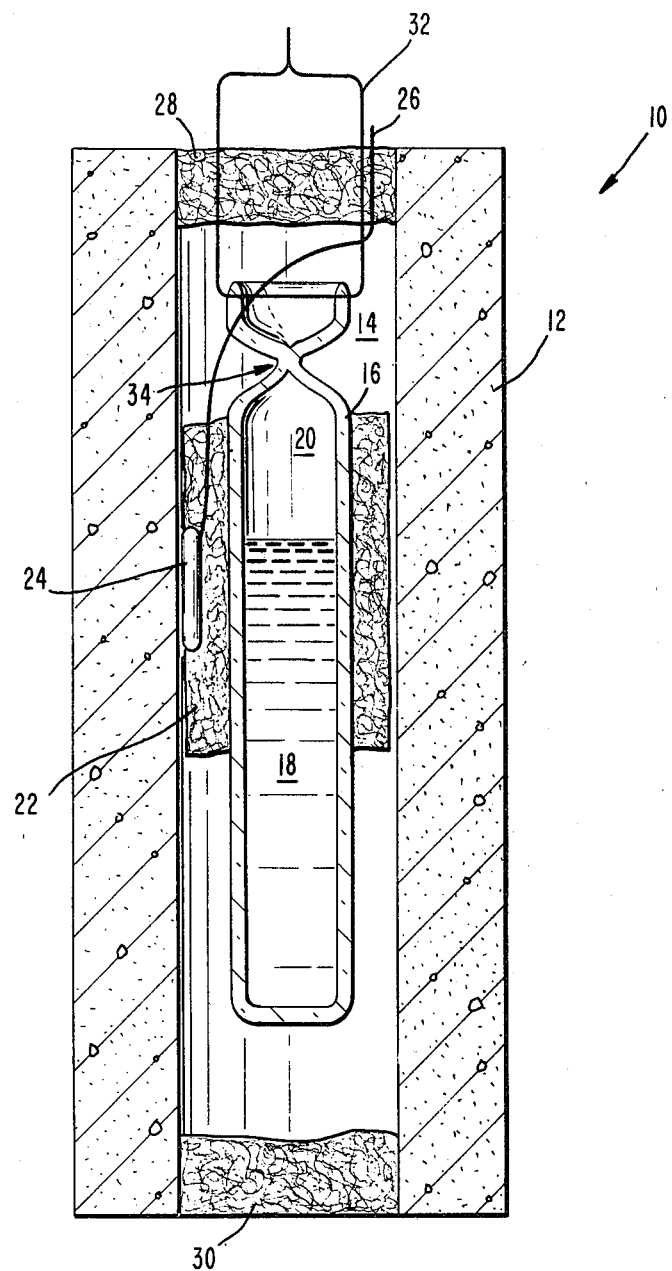
FIG. 3 is a view of apparatus appropriate for the practice of the present invention.

Apparatus essential to the process disclosed herein is shown in FIG. 3. Displayed in FIG. 3 is conventional electrically resistance heated rocking furnace 10. The rocking furnace 10 has a fire brick wall 12 which defines a cylindrical chamber 14 in which is positioned a quartz ampoule 16. Ampoule 16 contains a mixture 18 of mercury cadmium telluride above which is a vapor space 20. The ampoule 16 is wrapped in a layer of quartz wool 22, upon which there is attached a thermocouple 24. Conductors 26 of the thermocouple 24 pass through the top end of rocking furnace 10 for attachment to a conventional temperature readout device. A plug of quartz wool 28 tightly packed into the top end of the furnace 10 and a corresponding plug 30 packed into the lower end help retain heat within the furnace chamber 14. A stainless steel holding wire 32, which is utilized in the pulling of the ampoule 16 during the quenching process (discussed later), is attached to a pulley system (not shown). The wire 32 aids the securement of the ampoule 16 within the chamber 14. The wire 32 is attached to the ampoule 16 above a neck 34 formed by the heat sealing thereof. This apparatus and/or its various equivalents may comprise essential elements in the practice of the method of the present invention.

Prior to compounding of a mixture, the individual elements, each in a highly purified state, are maintained in a standard dry box (preferably equipped with an ante-chamber) at room temperature. Such a dry box, wherein a pure environment may be maintained by means of slight positive nitrogen gas pressure, is well known in the art and commercially available. Specific amounts of each element are measured out and a stoichiometric composition is prepared for a pre-selected cadmium telluride mole-fraction x. The compounding fraction x will, of course, generally be a function of the detection band appropriate for the specific end (detector) use. Preferably, the elements are layered into the ampoule in many stages as an aid to the generation of a homogeneous mixture. It must be kept in mind, however, that the mixture of cadmium and mercury exhibits an oxidizing reactivity in the presence of air. Therefore, a preferred layering consists of entering the entire quantity of mercury into the ampoule 16 followed by alternating layers of tellurium and cadmium (with no mercury-cadmium interface) until the desired total amounts of all elements are present. A slight excess of mercury (e.g., about one gram for about 180 gram total amount) is added to create an overpressure in the void space of the ampoule, thereby maintaining stoichiometry of the ingot during rocking and quenching.

The ampoule 16 containing the mixture is then removed from the dry box and the top thereof heat sealed with a $10^{-6}$ Torr vacuum pulled thereon. A conventional pump is adequate for the creation of such a vacuum. While the vacuum is being pulled and before the ampoule is heat sealed, the ampoule 16 is placed in a dewar flask having a liquid nitrogen environment. This helps to ensure that no air is trapped between the ampoule wall and the mercury as the latter contracts under the influence of the cold nitrogen.

The sealed ampoule 16 is next placed into the rocking furnace 10. The furnace 10 is activated to rock the ampoule ±45° from horizontal, at the rate of 5 cycles per minute during which the mixture is warmed to approximately 20° to 30° C. above liquidus through an elaborate heat up cycle. Such a cycle, the design of which is well known in the art, seeks to assure the homogeneity of the resultant heated mixture by taking into account the various reactions which occur between the constituent elements at different temperature plateaus. The exact temperature-time profile will depend upon the relative proportions of the constituent elements and, thus, is a function of x, although the cycle may be expected to be of greater than eight hours duration for the production of any compound capable of detector use.

After the temperature of the mixture is reached and maintained for several hours at the desired 20° to 30° C. above liquidus, the furnace 10 is turned off. The rocking continues and is terminated at +45° (with reference to the heat sealed top of ampoule 16) when the temperature of the mixture therein has dropped to about 8° C. above liquidus. At this temperature, the furnace is rotated to vertical (once again, with respect to the heat sealed top). The ampoule is allowed to further cool until the temperature has dropped below liquidus by the number of degrees to the quenching temperature indicated in FIG. 2, as a function of x. It is the maintenance of the ampoule 16, absent rocking action, at vertical until the appropriate quenching temperature indicated on FIG. 2 is reached, that results in the characterization of the invention herein as a supercool process. The ampoule's return to the vertical and subsequent maintenance at vertical during the time of this "supercooling" to the desired temperature (in the "slush" region 9) followed by the rapid pull (at the vertical) from the furnace thermally and mechanically shocks the ingot into forming or "locking in" a large number of small crystallites with relatively high energy grain boundaries.

After the production of an ingot according to the above-described compounding and quenching process, solid state recrystallization may then proceed. Any of a number of such processes, all well known in the art, may be employed. In a preferred process of recrystallization, the resulting ingot is placed into a new ampoule which, in turn, is placed into a furnace. The furnace maintains the ingot at approximately 20° C. below solidus for at least one month. The slow heating of the ingot serves to free the Gibbs free energy locked in its numerous small grain boundaries. The release of this energy continues until the ingot reaches some lower energy state. Generally, the low energy states are characterized by little disorder and single crystallinity. Thus, the recrystallization of the ingot produced as above, possessing a large amount of free energy locked in numerous small grain boundaries (high disorder), results in a large quantity of low disorder single crystal material.

EXAMPLE I

The above described process steps were followed in the production of single crystal mercury cadmium telluride having cadmium telluride mole-fraction x=0.215. The following stoichiometric quantities were combined as above in a dry chamber: 92.66 grams mercury, 14.07 grams cadmium and 74.28 grams tellurium. The amount of mercury included one additional gram of material for purposes of overpressure, as described above. This mixture, heat sealed in the ampoule, was brought to 846° C. by means of a conventional heat-up cycle. Rocking of the ampoule ±45° C. continued for 22 hours. After the termination thereof, the ampoule, containing associated ingot, was quenched (brought to vertical and removed from the furnace) at 796° C.

The above process yielded a cylindrical ingot measuring 17.6 centimeters in length by 1.2 centimeters in diameter. A four week long solid state recrystallization process at 15° C. below solidus in a mercury atmosphere produced a composition of 22 percent essentially single crystal, 50 percent having two or three grain boundaries and 28 percent polycrystalline, as determined by naked eye. Berg-Barnett and Lang x-ray topographs taken of a number of wafers exhibited single crystallinity. No peripheral pitting was detected.

EXAMPLE II

Mercury cadmium telluride of mole-fraction 0.280 was produced in accordance with the present invention. The method proceeded from the combination of 86.66 grams of mercury with 18.66 grams of cadmium and 75.68 grams of tellurium in an ampoule within the dry box. This stoichiometric mix, as that of the prior example, included one additional gram of mercury for overpressure. The mixture was heated to 862° C. before the discontinuance of resistance heating. The furnace containing the ampoule was rocked for 17 hours throughout the heat up cycle then terminated at +45°. Quenching occurred when the thermocouple temperature indicated 825° C.

The resulting ingot measured 19.9 centimeters in length with a 1.2 centimeter diameter. The ingot was recrystallized at 15° C. below solidus in a mercury atmosphere during a four week period. Visual (naked eye) analysis concluded 54 percent essentially single crystal, 26 percent with two or three grain boundaries and 20 percent polycrystalline. Several wafers examined by Berg-Barnett topography exhibited single crystallinity. Some peripheral pitting was detected.

As will be apparent from consideration of the above examples, the present invention provides a process for producing substantial amounts of single crystal mercury cadmium telluride from a given quantity of constituent elements. Material produced in accordance with the method exhibits minimal pitting and inclusions and essentially eliminates coring over a wide compositional detector range.

While rather specific terms have been used in describing several embodiments of the invention, they are not intended, nor should they be construed, as limitations upon the invention as claimed.

What is claimed is:

1. A process for producing single crystal $Hg_{1-x}Cd_xTe$ comprising the steps of:
   (a) producing an ingot of $Hg_{1-x}Cd_xTe$ having a large number of crystallites with small grain boundaries by the steps of:
      (1) adding predetermined amounts of mercury, cadmium and tellurium to a container to produce a stoichiometric mixture thereof of cadmium telluride molefraction x,
      (2) heating said mixture to a predetermined temperature above liquidus,
      (3) rocking said container at the same time to produce a homogeneous mixture of $Hg_{1-x}Cd_xTe$,
      (4) discontinuing the application of heat to said container,
      (5) terminating the rocking at +45° with respect to the vertical when the temperature of the mixture has dropped to about 8° C. above liquidus,
      (6) supercooling said mixture by maintaining said container at the vertical until the temperature of said mixture drops an amount below liquidus which is a predetermined function of x, and
      (7) quenching said mixture by exposing said container to ambient air temperature by rapidly withdrawing from the furnace so that there is produced an ingot of $Hg_{1-x}Cd_xTe$ having a large number of crystallites with small grain boundaries; and
   (b) applying heat to said ingot so that a solid state recrystallization process yielding a large amount of single crystal $Hg_{1-x}Cd_xTe$ is achieved.

2. The process of claim 1 in which said mixture is heated to about 20° to 30° C. above liquidus.

3. The process of claim 1 further characterized in that said container is placed in a rocking furnace whereby said mixture contained therein is rocked, heated and positioned according to the process herein.

4. A process for producing $Hg_{1-x}Cd_xTe$ ingots comprising the steps of:

(a) adding predetermined amounts of mercury, cadmium and tellurium to a container to produce a stoichiometric mixture thereof of cadmium telluride mole-fraction x;
(b) heating said mixture to a predetermined temperature above liquidus;
(c) rocking said container at the same time to produce to a homogeneous mixture of $Hg_{1-x}Cd_xTe$;
(d) discontinuing the application of heat to said container;
(e) terminating the rocking at $+45°$ with respect to the vertical when the temperature of the mixture has dropped to about 8° C. above liquidus;
(f) supercooling said mixture by maintaining said container at the vertical until the temperature of said mixture drops an amount below liquidus which is a predetermined function of x; and
(g) quenching said mixture by exposing said container to ambient air conditions by rapidly withdrawing from the furnace, so there is produced an ingot of $Hg_{1-x}Cd_xTe$ having a large number of crystallites with small grain boundaries.

5. The process of claim 1 in which said mixture is heated to about 20° to 30° C. above liquidus.

6. The process of claim 1 further characterized in that said container is placed in a rocking furnace whereby said mixture contained therein is rocked, heated and positioned according to the steps of the process herein.

* * * * *